(12) United States Patent
Biermayr et al.

(10) Patent No.: US 10,649,866 B2
(45) Date of Patent: *May 12, 2020

(54) METHOD AND APPARATUS FOR INDIRECTLY ASSESSING A STATUS OF AN ACTIVE ENTITY

(71) Applicant: Unify GmbH & Co. KG, Munich (DE)

(72) Inventors: Rodrigo Biermayr, Curitiba (BR); Evandro Hauenstein, Curitiba (BR); David Wiebe, Curitiba (BR); Thomas Nagel, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,169

(22) Filed: Oct. 16, 2018

(65) Prior Publication Data
US 2019/0050304 A1 Feb. 14, 2019

Related U.S. Application Data

(63) Continuation of application No. 15/298,387, filed on Oct. 20, 2016, now Pat. No. 10,133,644, which is a
(Continued)

(51) Int. Cl.
G06F 11/00 (2006.01)
G06F 11/20 (2006.01)
(Continued)

(52) U.S. Cl.
CPC ...... *G06F 11/2005* (2013.01); *G06F 11/2007* (2013.01); *G06F 11/2033* (2013.01);
(Continued)

(58) Field of Classification Search
CPC ............... G06F 11/2007; G06F 11/202; G06F 11/2023; G06F 11/2033; G06F 11/2038;
(Continued)

(56) References Cited

U.S. PATENT DOCUMENTS 5,978,933 A   11/1999  Wyld et al.
6,751,748 B1  6/2004   Bush
(Continued)

FOREIGN PATENT DOCUMENTS

EP   1533701 A1   5/2005

OTHER PUBLICATIONS

International Search Report for PCT/US2012/050531 dated Jul. 1, 2013.
(Continued)

*Primary Examiner* — Michael Maskulinski
(74) *Attorney, Agent, or Firm* — Buchanan Ingersoll & Rooney PC

(57) ABSTRACT

A method and system permit a backup entity of a redundant apparatus of a communication system that shares control of hardware resources or other network resources with an active entity to indirectly determine a status of the active entity based upon behavior and reaction to actions it takes in connection with resources it shares control of with the active entity. Such a method and system permit the backup entity to deduce the state of the active entity without having any a hardware connection or other communication connection with the active entity.

21 Claims, 5 Drawing Sheets

Related U.S. Application Data continuation of application No. 14/360,020, filed as application No. PCT/US2012/050531 on Aug. 13, 2012, now Pat. No. 9,501,371.

(51) Int. Cl.
  *H04L 29/08* (2006.01)
  *H04L 29/14* (2006.01)
  *H04L 12/24* (2006.01)

(52) U.S. Cl.
  CPC ...... *G06F 11/2038* (2013.01); *H04L 41/0668* (2013.01); *H04L 67/1029* (2013.01); *H04L 67/1034* (2013.01); *H04L 69/40* (2013.01); *H04L 67/1036* (2013.01)

(58) Field of Classification Search
  CPC ............. G06F 11/2046; G06F 11/2005; H04L 67/1034
  See application file for complete search history.

(56) References Cited

U.S. PATENT DOCUMENTS

| | | |
|---|---|---|
| 6,782,416 B2 | 8/2004 | Cochran et al. |
| 7,886,182 B1 | 2/2011 | Coatney et al. |
| 9,098,392 B1 | 8/2015 | Gadiraju et al. |
| 2002/0095470 A1 | 7/2002 | Cochran et al. |
| 2003/0123635 A1 | 7/2003 | Lee |
| 2004/0205148 A1 | 10/2004 | Hue et al. |
| 2004/0209580 A1 | 10/2004 | Bose et al. |
| 2005/0050376 A1* | 3/2005 | Gunda ................ G06F 11/2092 714/2 |
| 2005/0172161 A1 | 8/2005 | Cruz et al. |
| 2007/0275710 A1 | 11/2007 | Mayer et al. |
| 2008/0031226 A1 | 2/2008 | Eng et al. |
| 2008/0225837 A1 | 9/2008 | Brown |
| 2008/0304478 A1 | 12/2008 | Bittnar et al. |
| 2011/0179231 A1 | 7/2011 | Roush |
| 2012/0179771 A1 | 7/2012 | Ganti et al. |
| 2013/0326261 A1 | 12/2013 | Paulson |

OTHER PUBLICATIONS

Written Opinion of the International Searching Authority for PCT/US2012/050531 dated Jul. 1, 2013.

* cited by examiner

METHOD AND APPARATUS FOR INDIRECTLY ASSESSING A STATUS OF AN ACTIVE ENTITY

CROSS-REFERENCE TO RELATED APPLICATIONS

This application is a continuation application of U.S. patent application Ser. No. 15/298,387, which is a continuation of U.S. patent application Ser. No. 14/360,020, which is the U.S. national stage under 35 U.S.C. § 371 of PCT International Application No. PCT/US2012/050531, filed on Aug. 13, 2012.

FIELD OF INVENTION

The present invention relates to communication systems, such as communication systems that utilize cellular phones, mobile computer devices, tablets, laptops, or other terminal devices. More particularly, the present invention relates to an apparatus and method configured to permit a backup entity to indirectly determine a status of an active entity of a communication system based upon behavior and reaction to actions it takes in connection with resources it shares control of with the active entity.

BACKGROUND OF THE INVENTION

Communication systems often provide one or more services that need high availability and reliability of a communication related services. As a result, redundancy is often utilized in such systems to ensure that service interruption is kept to a minimum in case of equipment failure. Examples of systems that utilize redundant servers or other redundancy mechanisms are disclosed in U.S. Pat. No. 6,751,748 and U.S. Patent Application Publication Nos. 2003/0123635, 2004/0209580 and 2008/0304478.

Often, redundant systems require primary and backup servers to communicate with each other to have a complete knowledge of the service status of the other device. For instance, the primary sever may send a message to the backup server that identifies its current service status and the backup server may send a message to the primary server to identify its current service status. Such systems, however, can result in a backup server not quickly learning of a failure of a primary server if there fails to be a timely communication of a failure event to the backup server due to a communication failure or damage to the primary server. Such latency in the determination of a failure can result in undesirable time periods of poor service or time periods in which the service hosted by the primary server is unavailable to users.

A new system is needed for identifying a failure event that may require a backup device to take control of a process being overseen or managed by a primary device. We have determined that it would be preferable for embodiments of such a new system to permit redundancy to be provided without an exchange of messages having to occur between the primary and backup devices for the backup device to deduce that it should take over the services hosted by the primary device. Additionally, we have determined that it would be preferable for embodiments of such a system to avoid redundancy "split-brain" breakdown problems that occur when the redundancy communication system is broken and a primary server acts as a standalone or when a backup server wrongly takes control causing a double mastership on the network.

SUMMARY OF THE INVENTION

We have developed different embodiments of a method, system, apparatus and computer readable medium that are configured to permit a backup entity of a redundant apparatus of a communication system that shares control of hardware resources or other network resources with an active entity to indirectly determine a status of the active entity based upon behavior and reaction to actions it takes in connection with resources it shares control of with the active entity for purposes of providing redundant services. These embodiments may be configured to permit the backup entity to deduce the state of the active entity without having any a hardware connection or other communication connection with the active entity.

In one embodiment, a communication apparatus can include an active entity having at least one processor unit communicatively connected to at least one memory and a backup entity having at least one processor unit communicatively connected to at least one memory. The backup entity may be communicatively connected to the active entity via at least one communication connection. At least one resource may be communicatively connectable to the active entity and the backup entity. The active entity oversees or manages that at least one resource to provide a service and the backup entity provides a redundancy service for the active entity. When the at least one communication connection fails so that messages are not exchangeable between the backup entity and the active entity via the at least one communication connection, one of the backup entity and the active entity sends at least one first message to the at least one resource so that the at least one resource responds to that at least one first message for eliciting a reaction from the one of the a backup entity and the active entity that did not send that at least one first message. The elicited reaction may be comprised of at least one second message sent to the at least one resource that requires at least one action of the at least one resource that is interpretable by the one of the backup entity and the active entity that sent the at least one first message.

One embodiment of the apparatus may be configured to check the electrical status of one or more public switched telephone network links. The apparatus may include an active entity that is a gateway and a backup entity that is a gateway. The gateways may communicate with the one or more public switched telephone network links to permit the backup entity to indirectly deduce the state of the active entity in the event of a communication connection failure between the entities that prevents communications from being exchanged between the active and backup entities. The active entity may also be configured to communicate with the one or more public switched telephone network links to indirectly deduce the state of the backup entity without exchanging communications with that backup entity.

Embodiments of the apparatus may be configured so that the at least one first message is sent by a process that includes a backup entity taking over control of the at least one resource from an active entity for a first period of time to oversee or manage the at least one resource and then drops control of the at least one resource after the first period of time elapses. The active entity may then reinitiate control of the at least one resource by sending the at least one second message to the at least one resource. The reinitiation of control sought by the sent at least one second message may require the at least one resources to perform at least one action that is interpretable by the backup entity. The backup entity may then make a determination of a second time period passing in which the active entity does not reinitiate control of the at least one resource to determine that the active entity experienced a failure and as a result may take over control of the at least one resource to oversee or manage the at least one resource. Alternatively, the backup entity may then make a determination that the active entity took control of the at least one resource after the first time period and within the second time period such that the active entity is determined to be overseeing or managing the at least one resource after the first time period and within the second time period. The backup entity may then observe the at least one resource to monitor a status of service associated with the at least one resource for at least a third period of time.

In some embodiments, the communication apparatus may be a communication system, a server, or a gateway. The communication connection failure that occurs such that no messages are exchangeable between the backup and active entities via the at least one communication connection may be a failure of all communication connections between the active and backup entities in some embodiments of the apparatus. For instance, a failure of a network node necessary for interconnecting the active and backup entities may be such a failure.

In one embodiment, the communication apparatus is located within an enterprise network and the communication connection failure between the active and backup entities may be a failure so that all communication connections between the active and backup entities has occurred. The backup entity may send at least one first message as a first OPTIONS message so that the at least one resource responds to the first OPTIONS message by sending a first acknowledgement to the active entity. The active entity may send the at least one second message as a second OPTIONS message in response to receiving the first acknowledgement from the at least one resource. The at least one resource may respond to that second OPTIONS message by sending a second acknowledgement to the backup entity. The second acknowledgement may be an action that is interpretable by the backup entity.

The active entity may monitor the at least one resource to assess the status of service associated with the at least one resource during the first time period to determine whether the status of service associated with the at least one resource is improved relative to when the at least one resource is overseen or managed by the active entity to determine whether the active entity should retake control of the at least one resource during the second time period. If the status of service is improved, the active entity does not retake control of the at least one resource during the second time period. If the status of server is not improved, then the active entity does retake control of the at least one resource during the second time period.

The backup entity may observe the at least one resource for a third period of time to monitor a status of service associated with the at least one resource for at least a third period of time. This observation can result in a determination by the backup entity that the status of service is over or under a predetermined threshold value and the backup entity may take over the at least one resource to manage or oversee the at least one resource during the third time period as a result of this determination. In response thereto, the active entity may monitor the at least one resource when the backup entity controls that at least one resource after the takeover that occurs during or after the third time period to determine whether the status of service associated with the at least one resource is improved relative to when the at least one resource was overseen or managed by the active entity. If no improvement is determined to have occurred, the active entity may again retake control of the at least one resource. If an improvement is determined to have occurred, the active entity may not again try to retake control of the at least one resource.

A non-transitory readable medium has an application stored thereon that defines steps of a method for a backup entity when the application is executed by the backup entity. The method defined by the application includes the step of the backup entity determining that all communication connections failed between the backup entity and an active entity that communicates with the backup entity so that messages are not exchangeable between the backup entity and the active entity via at least one communication connection between the active and backup entities. The method defined by the application may also include the step of the backup entity sending a message to at least one resource the backup entity shares with the active entity so that the at least one resource responds to the at least one first message by sending a first response to the first message to the active entity that will elicit a response from the active entity. The backup entity may then assess the at least one resource to assess whether the active entity provides the response elicited by the first response that is to be sent by the at least one resource. Upon a determination that the at least one resource does not react to the elicited response, the backup entity determining that the active entity experienced a failure. Upon a determination that the at least one resource reacted to the elicited response from the active entity, the backup entity determining that the active entity is operational.

The method defined by the application may also include the step that upon determining that the active entity experienced the failure, the backup entity takes over control of the at least one resource to oversee or manage the at least one resource and upon determining that the active entity is operational, the backup entity observes the at least one resource to monitor a status of service associated with the at least one resource for at least a third period of time. The backup entity may retake control of the at least one resource in the event the status of service is at or exceeds a threshold value during third time period.

A method of providing a redundancy service is also provided. An embodiment of the method may include the step of a backup entity determining that all communication connections failed between the backup entity and an active entity that communicates with the backup entity so that messages are not exchangeable between the backup entity and the active entity via at least one communication connection between the active and backup entities. The active entity and backup entity may share at least one resource. The method may also include the step of one of the backup entity and the active entity may send at least one first message to the at least one resource so that the at least one resource responds to the at least one first message to elicit a reaction from the one of the backup entity and the active entity that did not send the at least one first message. The elicited reaction may include at least one second message being sent to the at least one resource that requires at least one action by the at least one resource that is interpretable by the backup entity or active entity that send the at least one first message.

Embodiments of the method be configured so that the sending of the at least one first message is comprised of the backup entity taking over control of the at least one resource from the active entity for a first period of time to oversee or manage the at least one resource and subsequently dropping control of the at least one resource after the first period of time elapses. The method may also include the steps of the backup entity making a determination of a second time period passing in which the active entity does not reinitiate control of the at least one resource and determining that the active entity experienced a failure and taking over control of the at least one resource to oversee or manage the at least one resource. Upon the backup entity making a determination of the active entity taking over the at least one resource within the second time period and after the first time period, the active entity is determined to be overseeing or managing the at least one resource and the backup entity oversees the at least one resource to monitor a status of service associated with the at least one resource. The backup entity may perform the observing to determine whether the status of service is at or exceeds a predetermined threshold value and may retake over the at least one resource to manage or oversee the at least one resource upon a determination that the status of service is at or exceeds the threshold value. It should be understood that the exceeding of the threshold value may involve the value being increased or decreased below the threshold value. For instance, if the threshold value is associated with a value that is considered to define an acceptable level of service if the value is a number at or above a predefined value, exceeding the threshold value may be exceeded by the value being below the threshold value. Alternatively, if the threshold value is associated with a value that is considered to define an acceptable level of service if the value is a number at or below a predefined value, then the threshold value may be exceeded by a value that is greater than the predefined value.

In some embodiments of the method, the backup entity and the active entity may each be a computer device such as a gateway, survivable proxy server, switch device, workstation, server, or other computer device that provides a service to a number of terminal devices or network elements. The network elements of terminal devices may be considered resources shared by the active and backup entities for such embodiments. In other embodiments of the method, the backup and active entities may be different hardware elements that share control of at least one other hardware element, which may be considered the shared resource.

Embodiments of the method may be configured so that the backup entity sends a first message of the at least one first message to the at least one resource and the at least one resource may respond to that first message by sending a first acknowledgement to the active entity. The active entity may receive the first acknowledgement and send a second message of the at least one second message to the at least one resource in response to the first acknowledgement. The at least one resource may receive that second message and send a second acknowledgement in response to the second message to the backup entity. The backup entity may receive that second acknowledgement. The backup entity may determine that the active entity is operational after receiving the second acknowledgement and may not attempt to take over control of the at least one resource. The backup entity may instead observe the at least one resource to monitor a status of service associated therewith. In some embodiments, the first acknowledgement may be a 200 OK message sent in accordance with Session Initiation Protocol and the second acknowledgement may also be a 200 OK message sent in accordance with Session Initiation Protocol. The first message and the second message may each be a modified OPTIONS message sent in accordance with Session Initiation Protocol. In one embodiment of the method, the backup entity may be a survivable proxy, the active entity may be a survivable proxy and the at least one resource may be comprised of a private branch exchange. In another embodiment of the method, the backup entity may be a gateway and the active entity may be a gateway. In yet other embodiments of the method, the backup entity and active entity may each be a computer device such as a server, network node, or other network element.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
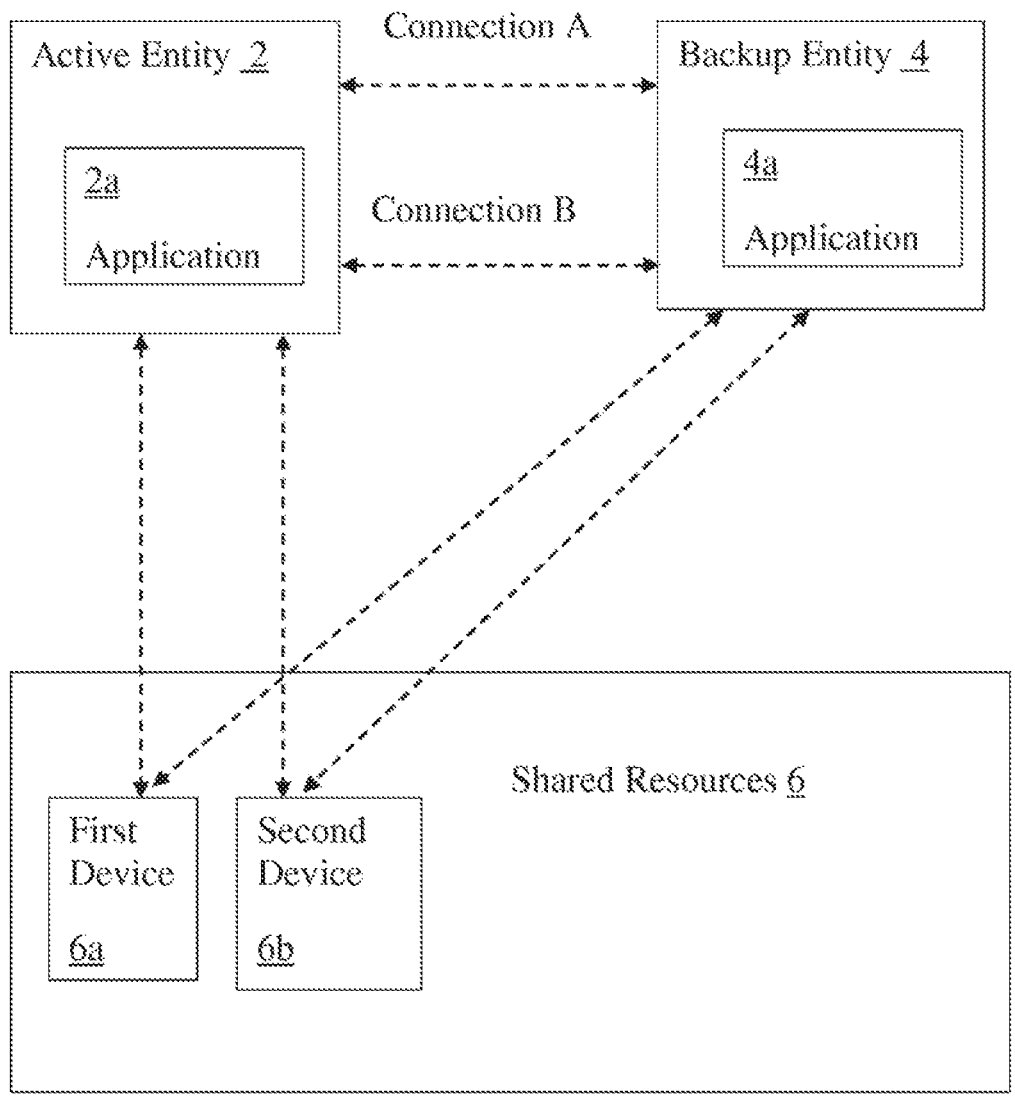
FIG. 1 is a block diagram of a first exemplary embodiment of a communication system.
Figure 2:
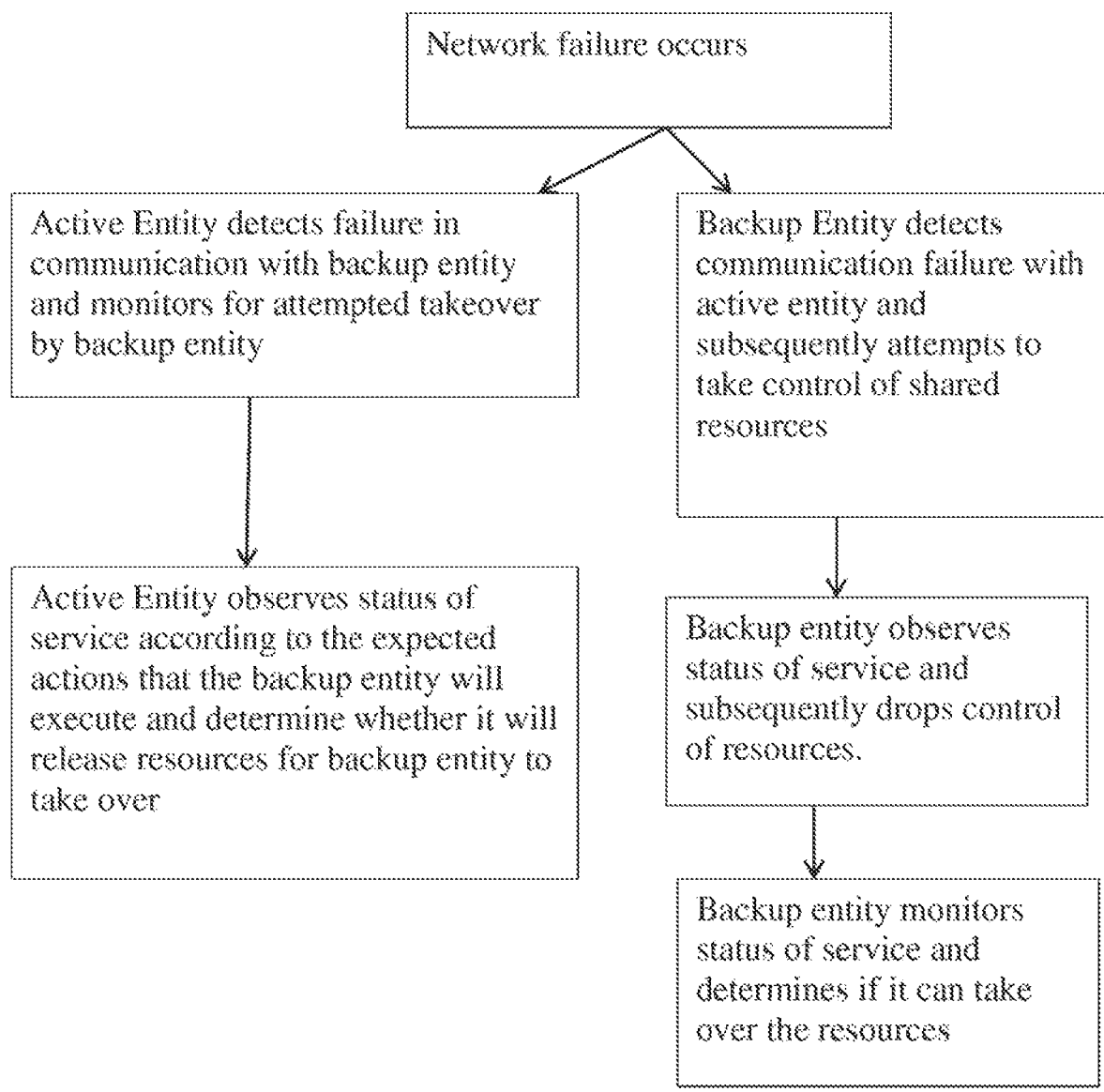
FIG. 2 is flow chart illustrating an exemplary embodiment of a method of utilizing a communication system.

Referring to FIGS. 1-2, an apparatus such as a communication system may include a redundancy communication management apparatus that includes an active entity 2 and a backup entity 4. The active entity and backup entity may each be separate servers or other computer devices that include at least one processor unit, non-transitory memory commutatively connected to the processor unit and at least one transceiver unit communicatively connected to the processor unit for sending and receiving messages or data to other devices to which they are communicatively connectable. It should be understood that the processor unit may be a microprocessor, interconnected microprocessors, a processor platform, or other type of hardware processor mechanism. The processor unit of the active entity 2 may be configured to execute an application 2a stored on the memory of the active entity 2. The processor unit of the backup entity 4 may be configured to execute an application 4a stored on the memory of the backup entity 4. Each application may each define a method that is performed upon execution of the program code of the applications by the processor unit of the active entity 2 or backup entity 4.

The backup entity 4 and active entity 2 may communicate with each other over one or more communication paths such as communication connection A and communication connection B. Each communication connection may be defined by a transmission path such as a wireless communication path, a wired communication path, or a combination of wireless and wired communication segments of such a path. Each transmission path may include messages being exchanged across a transmission path defined by one or more network nodes or one or more networks.

The backup entity 4 may monitor the communication connection active entity 2 has with the backup entity 4 and the quality of service of the communications being overseen or managed by the active entity 2. For instance, the backup entity 4 may monitor an electrical status of one or more communication links through which communications are exchanged such as a link between the backup entity 4 and the active entity 2 and one or more links between the active entity 2 and other devices. For instance, the backup entity 4 may monitor the electrical status of a communication link the active entity 2 has with a corporate office hub of an enterprise network or a branch of an enterprise network. Such managed communications may also include bandwidth or usage of other network resources of a network such as Session Initiation Protocol ("SIP") trunking connections. The network resources may include overseeing the utilizing of SIP trunking connections for connecting a communication endpoint within one network with a device in a different network or a remote network. For instance, the active entity 2 may actively monitor or oversee the electrical status of such a trunk or the formation and usage of a communication connection between a communication endpoint such as a computer, telephone, or communication terminal, with a remote cellular phone communicating via a network overseen by a cellular phone carrier provider. As another example, the active entity 2 may actively monitor the electrical line status for an enterprise network or the statuses of different terminals of such a network. As yet another example, the active entity 2 may actively monitor or oversee the formation and usage of a communication connection between a communication terminal of an enterprise network with a telephone of a wide area network associated with a remote site. Such established communication paths may traverse multiple different interconnected networks such as the internet.

The formation and usage of a communication connection overseen by the active entity 2 and backup entity 4 in the event the backup entity 4 takes over control of network resources being overseen by the active entity 2 may include firewall services that include ensuring traffic is originating from an authorized source, inspecting data packets transmitted along a communication path for protocol violations or irregularities, and to correct detected problems. If inspected data is not found to be valid, the data may be prevented from traversing further along a communication path, for example. The managed communication connections may also include the assignment of bandwidth to different communication paths between different communication endpoints and the establishment of connections between such devices.

The active entity 2 and backup entity 4 may be communicatively connected to shared resources 6, which may include network resources or hardware resources. Such resources may include a first device 6a and a second device 6b as well as other devices. The devices may each be different cabling, wiring, or trunking connectors for example. The devices may also include one or more servers that host a service for use by different communication terminals, such as a media server or a teleconference server. The shared resources may also include different wired communication paths or segments of such paths along which data is exchanged between different communication terminals, communication endpoints, or computer devices along a path that may traverse multiple networks. For example, the shared resources 6 may include a public switched telephone network ("PSTN") splitter-box, a SIP voice over internet private branch exchange ("SIP VoIP PBX"), a SIP phone, a universal serial bus ("USB") master-to-master cable, a USB with an Ethernet adaptor, a network cable, a Bluetooth compliant adapter, or a wireless network communication interface, or a Wi-Fi adaptor. Such shared resources may also include terminals or other devices or network resources that the active entity hosts a service for or communicates with to control communications exchanged by those devices.

The backup entity 4 may provide redundancy to ensure quality of service is not negatively affected in a substantial way upon a failure of the active entity or a failure in the network that otherwise prevents the active entity 2 from providing services at a predetermined threshold level. The backup entity 4 communicates with the active entity 2 over one or more communication connections defined between the entities such as connection A and connection B to ensure that the active entity 2 is performing its managerial or oversight services at or above the predetermined quality of service threshold or at and below that quality of service threshold when the quality value is preferred to be a low value. If there is a failure experienced in communications over all of the communication connections between the backup entity 4 and active entity 2, the backup entity 4 may determine that the active entity 2 has experienced a failure that requires the backup entity 4 to take over control of the shared resources to provide the managerial and oversight services initially provided by the active entity 2. For instance, the backup entity 4 may determine that a failure occurred if communications utilizing connections A and B are unable to be effectuated between the backup entity 4 and active entity 2.

The active entity 2 also monitors the communication connections A and B between the active entity and backup entity 4 to assess whether a communication failure has occurred. If such a failure is identified, the active entity 2 may monitor the shared resources 6 to determine whether the backup entity 4 attempts to take over control of the shared resources and compare the quality of service provided by the backup entity 4 as compared to the quality of service provided by the active entity 2 in a predefined time range extending from a predefined amount of time prior to the detection of the communication failure of connections A and B to the point in time of the detected failure.

The backup entity 4 may take over control of the shared resources 6 for a pre-specified amount of time upon detection of the failure of connections A and B. The backup entity 4 may then drop control of the resources for at least a predetermined period of time or preselected time range to assess whether it should take permanent control of the resources 6 due to a failure to the active entity 2 or a failure associated with the ability of the active entity 2 to communicate with the resources 6. If the active entity 2 does not take control of the resources 6 within the predetermined time period or preselected time range, the backup entity 4 may take over the control of the resources.

For example, the backup entity 4 may take over control of the shared resources 6 for the predetermined amount of time and then drop that control. The backup entity 4 may then monitor to determine whether the active entity 2 sends a STATUS request message to a corporate office hub or other device or receives a response from such a message. If the STATUS message is not detected as being sent within a predefined amount of time or no response to such a message, such as a STATUS ACK message, is detected within the predefined amount of time, the backup entity 4 will retake control of the shared resources. In contrast, if the sending of the STATUS request message and receipt of a STATUS ACK response to that message are detected, then the backup entity 4 will not retake over control of the shared resources 6.

If the active entity 2 does take back control of the resources, the backup entity 4 will continue to monitor the status of service provided by the resources. If the quality of service drops at or below a predetermined threshold, the backup entity 4 may again take initial control of the resources for a predetermined amount of time and subsequently drop that control to again see if the active entity 2 will take control of the resources. If no such control is exerted by the active entity 2 within a certain time range at this later time, the backup entity 4 can resume control of the resources as a primary service provider. In contrast, if the active entity 2 again takes back control of the resources, the backup entity 4 will return to monitoring the status of service of the resources until it determines that the quality of service has again dropped below a predetermined threshold for a certain period of time. If such an event is again detected, the backup entity 4 may again repeat its efforts to take over control of the resources by taking over for an initial time period and subsequently dropping that control to see if the active entity 2 will again take control or agree that the backup entity 4 should take over control of the resources by not responding to the dropping of the control performed by the backup entity 4 such that the backup entity 4 must reinitiate control of the resources to resume control of the resources due to a failure associated with the active entity 2.

The active entity 2 may monitor the control of the resources and the quality of service or state of service of the resources 6 while the backup entity 2 takes initial control of the resources in response to a detected failure of the connections A and B between the backup entity 4 and active entity 2. If the active entity 2 determines that the state of service or quality of service provided by the backup entity 4 is substantially better than what the active entity 2 can provide, the active entity 2 may not take back control of the resources upon the backup entity 4 voluntarily dropping control after a predetermined amount of time to signal to the backup entity 4 that the backup entity 4 should resume control of the resources more permanently. The active entity 2 may also determine it is unable to provide any such services due to a failure and therefore not respond by attempting to take control of the resources to signal to the backup entity 4 that the backup entity 4 should take control of the shared resources 6. Such inactivity within a selected time period from the time the initial control taken by the backup entity 4 is dropped permits the active and backup entities to signal to each other without having any communication connections formed between the devices by only requiring the entities to interpret the behavior and reaction to actions taken with respect to the shared resources. This permits the redundancy provided by the backup entity 4 to be provided even without the backup entity 4 being able to exchange messages or data with the active entity 2. Such a redundancy actuation mechanism permits embodiments of the communication system to not have to rely upon hardware that allows communication between the entities to determine when a backup device needs to take over for an active or primary service providing device.

In some embodiments, the backup entity 4 may also initiate a permanent takeover of the resources after a detection of multiple such instances of the quality of service or status of service being at or below a low threshold value or at or below an undesirable high threshold value (e.g. for systems where high numbers are undesirable and low numbers are desirable) for a predetermined period of time and has initiated a predetermined number of initial takeovers of the resources 6 within this same time period. In such embodiments, the backup entity 4 may be configured to determine that the active entity 2 has experienced a substantial failure and is unable to recognize this fact to voluntarily cede control to the backup entity 4 by not resuming control upon the backup entity's prior dropping of control of initial take overs in previously made takeover attempts due to poor quality of service detection.

It should be appreciated that the memory of the backup entity 4 may include an application 4a that includes code that defines instructions for the backup entity 4 when the processor unit runs the code of the application 4a. The instructions may define a method that the backup entity 4 performs, such as steps of the method illustrated in FIG. 2 or other steps that define functionality of a backup entity as discussed above or below. The active entity 2 may also include an application 2a on memory that defines steps of a method that occur when the processor unit of the active entity 2 executes the code of the application. The steps of the method may include steps shown in FIG. 2 for example or other steps that define functionality of an active entity discussed above or below.

Figure 3:
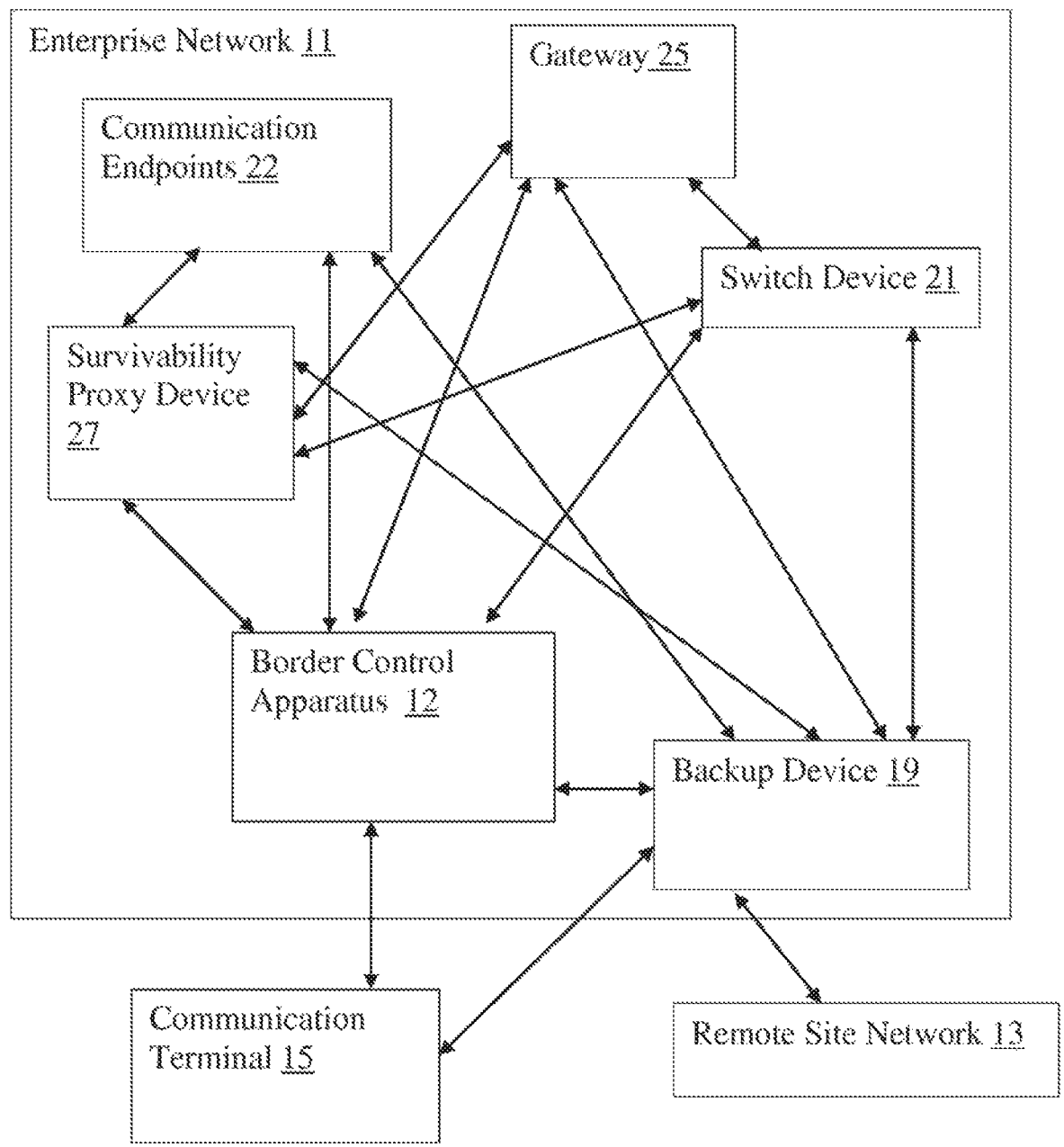
FIG. 3 is a block diagram of a second exemplary embodiment of a communication system.

An example of one type of embodiment of a computer apparatus may be the system of FIG. 3, which may utilize an active entity and backup entity as discussed above with reference to FIGS. 1-2. For instance, the system of FIG. 3 may include multiple networks such as an enterprise network 11 and a remote site network 13. Though not explicitly illustrated, it should be understood that each network may include multiple network nodes such as routers, base stations, or access points for providing access to a network in addition to other network nodes such as media servers, conference servers, and other service hosting devices for hosting one or more communication services within a network. A communication terminal 15 that is able to communicate with the enterprise network via a cellular network maintained by the service provider of the communication terminal 15 is also shown in FIG. 3.

Communication endpoints (not shown) of the remote side network and the communication terminal 15 may communicate with communication endpoints 22 of the enterprise network via a border control apparatus 12. The border control apparatus 12 may communicate with communication endpoints 22 such as telephones, computers, laptops, tablets or other computer devices of the enterprise network 11. The border control apparatus 12 may also communicate with at least one gateway 25, a survivability proxy device 27 that functions as a survivability proxy, a switch device 21 and a backup device 19 of the enterprise network 11. In some embodiments, the switch device 21 may be a private branch exchange or other switch device and one gateway 25 may permit the border control apparatus to communicate with other networks, such as a PSTN.

The border control apparatus 12 may be an active entity 2 as discussed above with reference to FIGS. 1-2. The border control apparatus may provide firewall services data packets sent along communication connections established between the communication endpoints 22 of the enterprise network and the communication terminal 15 or communication endpoints of the remote site network 13. Such data packets may be transmitted to the communication endpoints 22 along a transmission path that includes intermediary networks such as the internet. The border control apparatus 12 may receive such data packets to evaluate the data packets to ensure that the data packets are authorized for access to the enterprise network 11 or one or more of the communication endpoints 22. For instance, the border control apparatus 12 may evaluate the data packets to ensure traffic is originating from an authorized source, inspect the data packets transmitted along a communication path for protocol violations or irregularities, and to correct detected problems. If inspected data is not found to be valid, the data may be prevented from traversing further along a communication path, for example. The border control apparatus may also provide other services such as bandwidth assignment services or other communication connection establishment related services that may help facilitate the formation of active communication sessions such as a video phone call, a video conference call, a telephone conference call, or an audio only audio call. The border control apparatus may also assign a particular line of a SIP trunk for transmission of data to a particular communication endpoint of the enterprise network 11 for example.

The backup device 19 may be a backup entity such as backup entity 4 of FIGS. 1-2 discussed above. The backup device 19 may function as a backup border control apparatus and provide a redundancy to the system in case the border control apparatus 12 experiences a failure with its equipment or communication transmission path equipment that enables the border control apparatus 12 to provide services to at least some of the communication endpoints 22, the switch device 21, or network nodes of the enterprise network 11. The backup device 19 may be communicatively connectable with the switch device 21, gateway 25, survivability proxy device 27, communication endpoints 22, and network nodes of the enterprise network 11 in addition to the border control apparatus 12 so that the backup device 19 is able to oversee the operational performance of the border control apparatus 12 and take over the control from the border control apparatus 12 in response to a detected failure.

In the event there is a failure in communication between the backup device 19 and border control apparatus 12, the backup device 19 may perform an initial takeover of the services rendered by the border control apparatus 12 for an initial predetermined time period and then drop the control upon the expiration of this time period to assess whether the border control apparatus 12 will resume control of the services or not. If no such resumption of services by the border control apparatus 12 occurs, the backup device 19 will determine that the border control apparatus 12 experienced a failure and will reestablish control and perform the services previously controlled by the border control apparatus 12.

In the event that the border control apparatus 12 resumes control of the dropped services, the backup device 19 will return to monitoring the state of services being rendered by the border control apparatus while inter-entity communications between the backup device 19 and border control apparatus 12 are unable to occur to determine whether the border control apparatus 12 experienced a failure that prevents the apparatus from providing services at a predetermined quality level. If that quality level is not sustainable for a selected period of time such that the state of services being rendered is below a desired quality level, the backup device 19 may initiate an initial takeover of the services for the initial time period and then drop that control. The border control apparatus 12 may monitor that state of service while the backup device 19 is in control of the services to determine whether the backup device 19 is able to provide a better quality of service or state of service than the border control apparatus 12. If this is the case, the border control apparatus 12 will not resume control of the services for a predefined time period such that the backup device 19 reestablishes control of the services for overseeing the services. Alternatively, if the border control apparatus 12 determines that it can provide the same level or better quality of service, then it may reestablish control within the predefined time period so that the backup device 19 does not initiate a more permanent takeover of the services to control the services.

In yet other embodiments of the communication system of FIG. 3, the backup device 19 may be a backup entity 4 for the switch device instead of the border control apparatus 12 and the switch device 21 may be an active entity 2. The switch device 21 may be a server or private branch exchange that is responsible for facilitating the establishment of communication connections between communication endpoints 22 of the enterprise network 11, for example. The backup device 19 may communicate periodically with the switch device to obtain state of service information as well as monitor the quality of service of the performance of the switch device 21 by communicating with other network nodes and communication endpoints 22 of the enterprise network 11. In the event there is a failure in communication between the backup device 19 and switch device 21, the backup device 19 may perform an initial takeover of the services rendered by the switch device 21 for an initial predetermined time period and then drop the control upon the expiration of this time period to assess whether the switch device 21 will resume control of the services or not. If no such resumption of services by the switch device 21 occurs, the backup device 19 will determine that the switch device experienced a failure and reestablish control and perform backup services.

In the event that the switch device 21 resumes control of the dropped communication connection services, the backup device 19 will return to monitoring the state of services being rendered by the switch device 21 while inter-entity communications are unable to occur due to the communication failure to determine whether the switch device 21 experienced a failure that prevents the switch device 21 from providing services at a predetermined quality level. If that quality level is not sustainable for a selected period of time such that the state of services being rendered is below a desired quality level, the backup device 19 may initiate an initial takeover of the services for the initial time period and then drop that control. The switch device 21 may monitor that state of service while the backup device 19 is in control of the services to determine whether the backup device 19 is able to provide a better quality of service or state of service than the switch device 21. If this is the case, the switch device 21 will not resume control of the services for a predefined time period such that the backup device 19 reestablishes control of the services for overseeing the services. Alternatively, if the switch device 21 determines that it can provide the same level or better quality of service, then it may reestablish control within the predefined time period so that the backup device 19 does not take over a more permanent control of the services.

The backup device 19 could alternatively be a backup device of the survivability proxy 27 or the gateway 25. If the backup device 19 is a backup entity for the gateway 25, for example, the backup device 19 may be a backup entity 4 for the gateway 25 and the gateway 25 may be an active entity 2. The gateway 25 may be a server or other communication device that is responsible for monitoring the status of a link of a branch of an enterprise network has with the rest of the enterprise network or a corporate office hub. For instance, the gateway 25 may be responsible for monitoring the electrical status of a link that interconnects a branch of the enterprise network that the gateway is assigned to a hub for the enterprise network. The gateway 25 may also be responsible for facilitating the exchange of communications along the link to the hub of the enterprise network. The backup device 19 may communicate periodically with the gateway 25 to obtain state of service information as well as monitor the quality of service of the performance of the gateway 25 by communicating with other network nodes and communication endpoints 22 of the enterprise network 11. In the event there is a failure in communication between the backup device 19 and gateway 25, the backup device 19 may perform an initial takeover of the services rendered by the gateway 25 for an initial predetermined time period and then drop the control upon the expiration of this time period to assess whether the gateway 25 will resume control of the services or not. If no such resumption of services by the gateway 25 occurs, the backup device 19 will determine that the gateway 25 experienced a failure and reestablish control and perform backup services.

In the event that the gateway 25 resumes control of the dropped communication connection services, the backup device 19 will return to monitoring the state of services being rendered by the gateway 25 while inter-entity communications are unable to occur due to the communication failure to determine whether the gateway 25 experienced a failure that prevents the gateway 25 from providing services at a predetermined quality level. If that quality level is not sustainable for a selected period of time such that the state of services being rendered is below a desired quality level, the backup device 19 may initiate an initial takeover of the services for the initial time period and then drop that control. The gateway 25 may monitor that state of service while the backup device 19 is in control of the services to determine whether the backup device 19 is able to provide a better quality of service or state of service than the gateway 25. If this is the case, the gateway 25 will not resume control of the services for a predefined time period such that the backup device 19 reestablishes control of the services for overseeing the services. Alternatively, if the gateway 25 determines that it can provide the same level or better quality of service, then it may reestablish control within the predefined time period so that the backup device 19 does not take over a more permanent control of the services.

Figure 5:
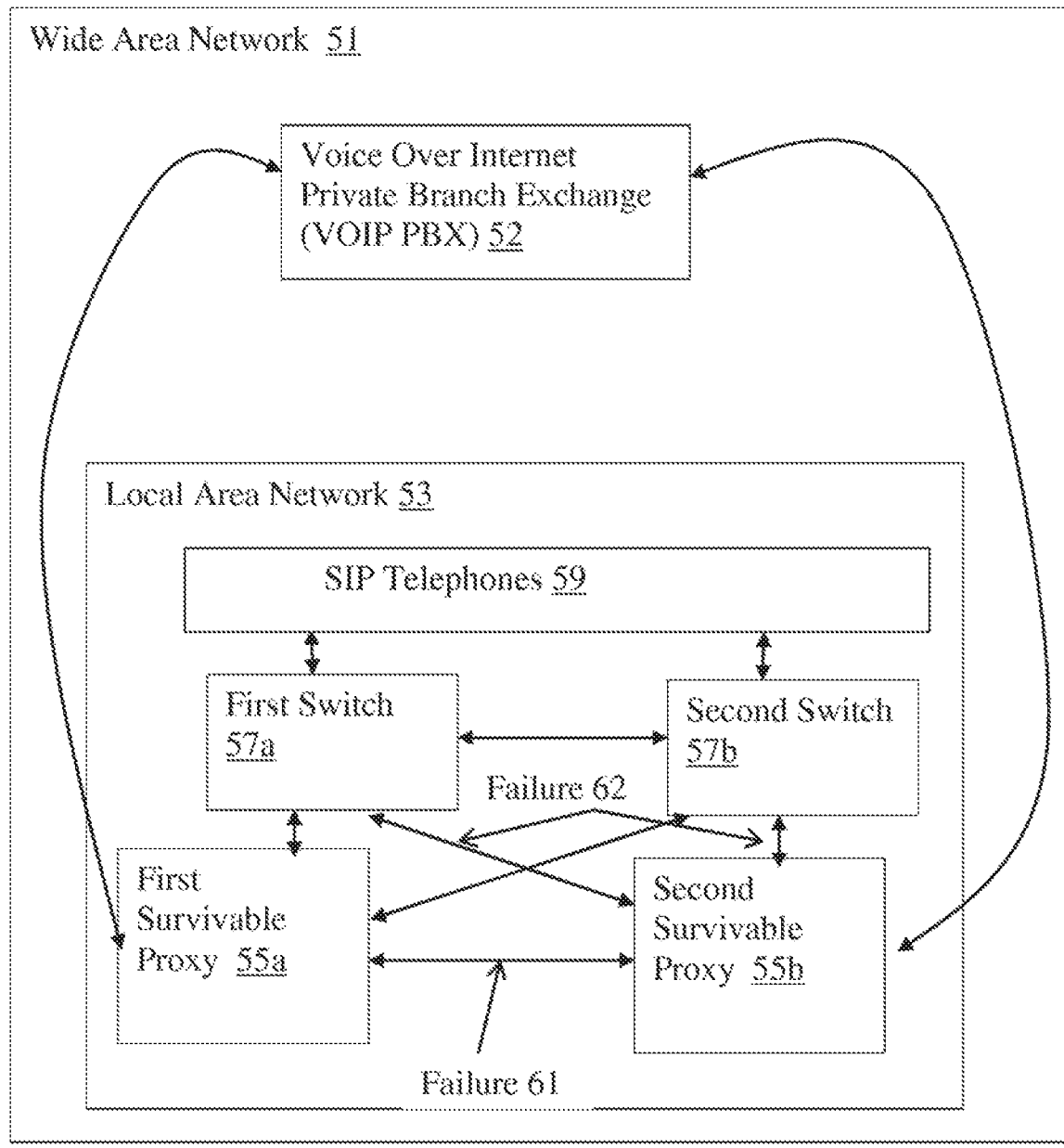
FIG. 5 is a block diagram of a third exemplary embodiment of a communication system.

Another example of a communication system that may utilize an active entity and a backup entity as discussed above with reference to FIGS. 1-2 and FIG. 3 is shown in FIG. 5. The system of FIG. 5 may be considered an example of an enterprise network 11 shown in FIG. 3 where the enterprise network 11 is a wide area network 51 and the switch device 21 shown in FIG. 3 is a voice over internet private branch exchange ("VOIP PBX") 52, which may be for example an SIP VoIP PBX. The switch device may communicate with a local area network 53 of the wide area network 51 for routing communications from and to network elements of the local area network.

The local area network 53 may include SIP telephones 59. The telephones may be SIP telephones or other communication terminal devices that have SIP telephony or voice over internet telephony functionality. The SIP telephones 59 may communicate with a first switch 57a for routing of communications to and from those telephones and may also communicate with a second switch 57b for routing of communications to and from those telephones. The first and second switches 57a and 57b may communicate with each other for routing communications between the SIP telephones 59 of the local area network 53. The first switch 57a and the second switch 57b may be communicatively coupled with a first survivable proxy 55a and a second survivable proxy 55b. The first survivable proxy 55a may be a master survivable proxy device such that the first survivable proxy 55a functions as an active entity 2 as discussed above with reference to FIGS. 1-2 and the second survivable proxy may be a backup survivable proxy device such that the second survivable proxy functions as a backup entity as discussed above with reference to FIGS. 1-2. The first and second survivable proxies may be SIP survivable proxy servers or other survivable proxy computer devices. The first and second survivable proxies 55a and 55b may each be communicatively connectable to the private branch exchange 52 of the wide area network 51. The VOIP PBX 52 may be the shared resource of the first and second survivable proxies 55a, 55b.

As shown in FIG. 5, a failure 61 and a failure 62 may occur to communications the second survivable proxy 55b has with the first and second switches 57a, 57b of the local area network 53 and with the first survivable proxy 55a. When the second survivable proxy 55b loses the connectivity with the first survivable proxy 55a, it may send a first request message, which may be a modified OPTIONS message sent in accordance with SIP, via the wide area network to the VOIP PBX 52 of the wide area network. The modified OPTIONS message may traverse multiple other local area networks of the wide area network 51 prior to being received by the VOIP PBX 52. The first request message sent by the second survivable proxy 55b may be modified to contain the via, from and contact header of the first survivable proxy 55a so that the private branch exchange 52 will respond to such a message by sending the response to the first survivable proxy 55a. For example, the first request message may be a modified OPTIONS message that has a modified via, from and contact header that identifies the internet protocol address or the fully qualified domain name, or other address of the first survivable proxy 55a.

In response to first request message sent by the second survivable proxy 55b, the VOIP PBX sends an acknowledgement message of this message to the first survivable proxy 55a. The acknowledgement message may be a 200 OK message that is sent according to SIP Request For Comments 3261 ("RIF 3261), for example. The first survivable proxy 55a receives the unexpected acknowledgement message from the VOIP PBX 52 if it is in an operational state. If operational, the first survivable proxy 55a will respond to the unexpected acknowledgement message from the VOIP PBX 52 by sending it another request message, which may be an OPTIONS message, using a modified via, from and contact headers of the second survivable proxy 55b so that a response to such a message will be sent to the second survivable proxy 55b. For example, this other request message may be a modified OPTIONS message that has a modified via, from and contact header that identifies the internet protocol address, the fully qualified domain name, or other address of the second survivable proxy 55b. The modified OPTIONS message may traverse multiple other local area networks of the wide area network 51 prior to being received by the VOIP PBX 52.

In response to the second request message from the first survivable proxy 55a, the VOIP PBX will send an acknowledgement message, such as the 200 OK message, to the second survivable proxy. The second survivable proxy will receive the unrequested acknowledgement message from the VOIP PBX and understand that to indicate that the first survivable proxy is still operational and will therefore not take over control of the shared resource, the VOIP PBX 52.

If no such acknowledgement is received from the VOIP PBX 52 within a predefined time period from the time at which the first request message was sent by the second survivable proxy 55*b*, then the second survivable proxy 55*b* will take over control of the shared resource, which is the VOIP PBX 52, as it will understand the first survivable proxy 55*a* to not be operational. It should be appreciated that such an event could occur by the first survivable proxy 55*a* being damaged and failing to respond to the first acknowledgement message it is sent via the VOIP PBX 52.

Of course, alternative embodiments of the system may be configured so that the first survivable proxy utilizes a similar modified OPTIONS message to initiate a messaging method similar to the above discussed method disclosed with reference to FIG. 5 in the event a failure occurred such that the first survivable proxy 55*a* lost connectivity with the second survivable proxy. For instance, the first survivable proxy could send a first modified OPTIONS message to the VOIP PBX to attempt to elicit a response from the second survivable proxy 55*b* to learn whether the second survivable proxy was still operational or not. The VOIP PBX may then send an acknowledgement of this first OPTIONS message to the second survivable proxy 55*b* that may then respond via another modified OPTIONS message so that the VOIP PBX sends an acknowledgement of the second modified OPTIONS message to the first survivable proxy so that it learns that the second survivable proxy is still operational.

Figure 4:
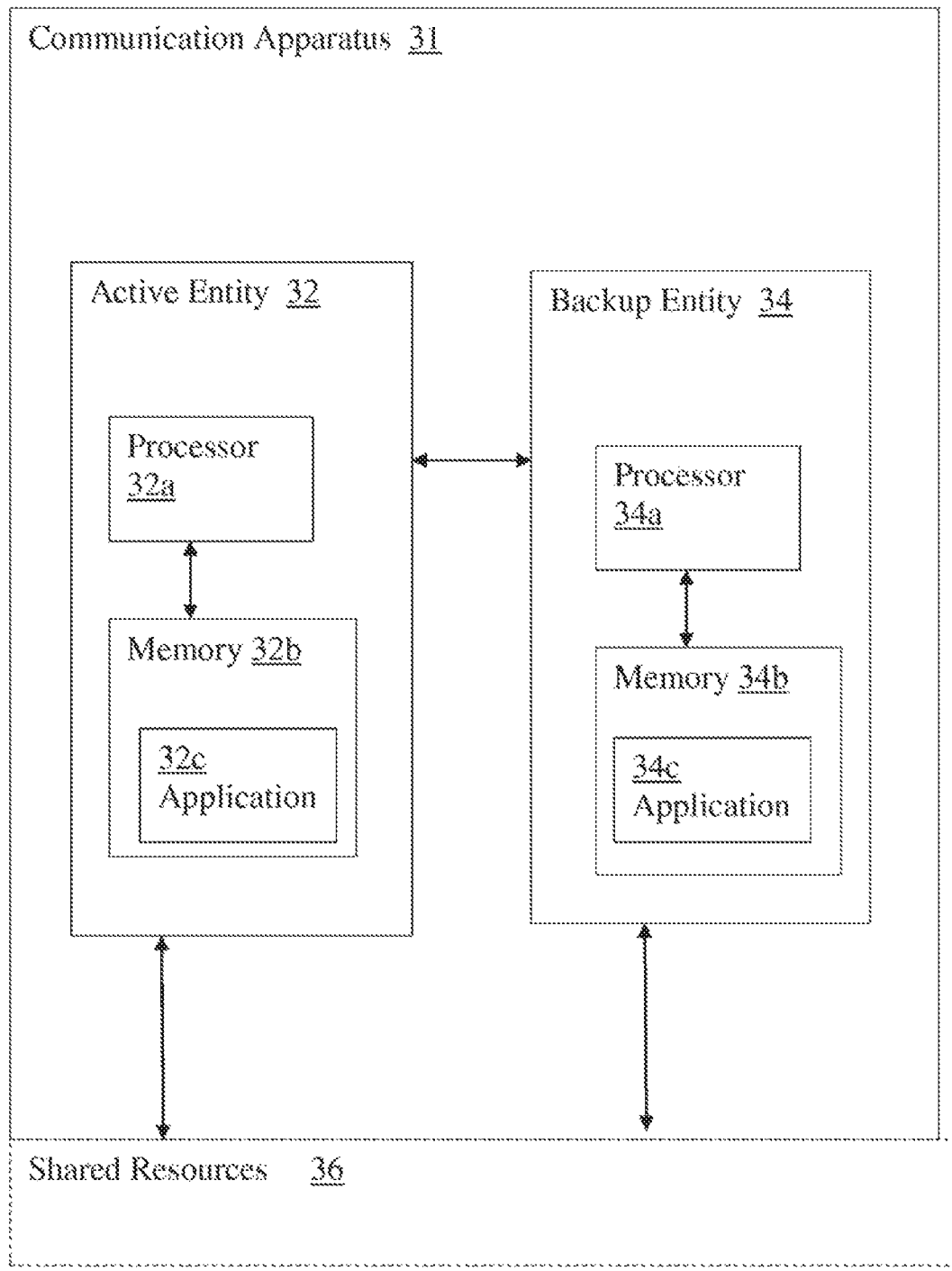
FIG. 4 is a block diagram of an exemplary embodiment of a communication apparatus.

Yet another example of a computer apparatus that may utilize an active entity and backup entity as discussed above with reference to FIGS. 1-2 is provided with reference to FIG. 4. A communication apparatus 31 may also utilize an active entity 32 that may function similarly to active entity 2 discussed above with reference to FIGS. 1-2 and a backup entity 34 may function similarly to the backup entity 4 discussed above with reference to FIGS. 1-2.

It should be understood that the communication apparatus 31 of FIG. 4 provides yet another example of how the backup and active entities may function in certain systems, devices, or other apparatuses. For instance in one contemplated embodiment, the communication apparatus 31 may be a gateway. In another contemplated embodiment, the communication apparatus 31 is an enterprise network and the active entity 32 is a primary gateway and the backup entity 34 is a backup gateway.

The active entity 32 may include a processor 32*a* that is communicatively connected to non-transitory memory 32*b* and the backup entity 34 may also include at least one processor 34*b* communicatively connected to non-transitory memory 34*b*. In one embodiment, the communication apparatus 31 may be a computer device such as a server or workstation and the active entity 32 and backup entity 34 may be separate processor cards or server cards. For instance, the separate server cards may share certain shared resources 36 such as hardware resources used by the communication apparatus 31 for hosting a communication service such as teleconferencing, media distribution, or media sharing. The shared resources 36, which are illustrated in broken line in FIG. 4, may be hardware elements that are integral with or attached to the communication apparatus 31 or may be elements that are spaced apart from the communication apparatus and are communicatively connected to the communication apparatus. The active entity may be in control of the shared resources and the backup entity 34 may serve a redundancy function in the event of a failure of the active entity. The active entity 32 and backup entity 34 may be communicatively coupled or connected to each other and exchange periodic messages to indicate a state of service of each respective element. If this communication connection fails, each device may detect that failure. In response to the detected inter-entity communication failure, the backup entity may try to take command of the shared resources 36 and observe the status of service of the service offered by the communication apparatus while the backup entity 34 is in control of the resources. The backup entity 34 then may drop the control of the resources 36 to observe and determine whether the active entity 32 will retake control of the resources 36. If the active entity 32 does not retake control within a predetermined amount of time the backup entity 34 will determine that the active entity 32 has experienced a failure and retake control and maintain control of the resources 36.

In the event the active entity 32 retakes control of the shared resources 36 within the predetermined amount of time, the backup entity 34 will continue to observe the status of service of the communication apparatus 31 provided by the resources 36 overseen or managed by the active entity 32 for at least as long as the communication failure between the entities exist. If the status of service, or quality of service rendered after the active entity 32 resumed control is at or below a preselected quality threshold for a certain period of time while inter-entity communications are unable to occur due to a failure, the backup entity 34 may determine that the active entity 32 has experienced damage or other failure preventing it from providing a desirable level of quality of service and take over control of the resources as the backup entity 34 may be able to control the resources 36 to maintain the status of service at or above that desirable level of service.

In yet another embodiment of the communication apparatus 31, it is contemplated that the communication apparatus 31 may be a network and the active entity 32 and backup entity 34 may be network nodes in which the backup entity 34 serves as a backup node for the active entity 32. The shared resources 36 to which the active and backup entities communicate may be any of a number of network elements, such as access points, communication terminals or endpoints. The active entity and backup entity may operate similarly to the active and backup entity 2 and 4 discussed above with reference to FIGS. 1-2 when communications between the entities fail so that the backup entity may assess whether the active entity experienced a failure or damage requiring the backup entity to take over control of the shared resources for providing at least a desired level of service without exchanging messages via inter-entity communications.

It should be understood that embodiments of the system, method and apparatus may be utilized having any of a number of different configurations. For instance, an undesirable threshold value that the backup entity utilizes in some systems may be configured so that the backup entity initiates a takeover of resources upon the threshold value being reached or exceeded by a value being at or above the threshold value or by the value being at or below the threshold value. It should be understood that the threshold value may be a value that is set to meet a particular design objective. As another example, the active entity and backup entity may be separate servers, separate computers or separate computer devices in some embodiments. In other embodiments, it is contemplated that the active entity and backup entity may be separate processor units of a computer device such as a server or switch that oversees or manages certain communications passing through a communication interface of the server or switch used to establish and maintain communications between different communication terminals of one or more networks. As yet another example, the resources shared between the active entity and backup entity may be redundancy hardware that could be any of a number of different types of hardware that has its operations overseen or managed by the active and backup entities. As yet another example, any predetermined time range or predetermined time period may be any time period that achieves a particular desired design objective. For instance, some time periods may be in less than one millisecond while other time periods may be more suitable for longer time periods such as time ranges of 2-5 milliseconds or 1-15 seconds.

While certain present preferred embodiments of the communication apparatus, communication system, and methods of making and using the same have been shown and described above, it is to be distinctly understood that the invention is not limited thereto but may be otherwise variously embodied and practiced within the scope of the following claims.

What is claimed is:

1. A method of providing redundancy comprising:
   a backup entity determining that a failure occurred such that messages are not exchangeable between the backup entity and an active entity;
   the backup entity taking over control of at least one resource from the active entity for a first period of time to oversee or manage the at least one resource in response to the determining that the failure occurred;
   the backup entity dropping control of the at least one resource after the first period of time elapses; and
   upon the backup entity determining that the active entity has not reinitiated control of the at least one resource within a second period of time after the backup entity dropped control of the at least one resource, the backup entity determining that the active entity experienced a failure and taking over control of the at least one resource to oversee or manage the at least one resource.

2. The method of claim 1 comprising:
   the backup entity observing the at least one resource to monitor a status of service associated with the at least one resource within the second period of time to determine whether the status of service is at or exceeds a predetermined threshold value.

3. The method of claim 2 comprising:
   the active entity taking over control of the at least one resource during the second period of time after the backup entity performs the dropping control of the at least one resource.

4. The method of claim 2 wherein the predetermined threshold value is exceeded when the predetermined threshold value is below or above a pre-selected value.

5. The method of claim 1 comprising:
   the active entity taking over control of the at least one resource during the second period of time after the backup entity performs the dropping control of the at least one resource.

6. The method of claim 1 wherein the backup entity is a computer comprising at least one processor and non-transitory computer readable medium.

7. The method of claim 1 wherein the at least one resource and the backup entity are within an enterprise network and the backup entity is a server.

8. The method of claim 7 wherein the active entity is within the enterprise network and the active entity is a server.

9. A non-transitory computer readable medium having an application stored thereon that defines steps of a method for a backup entity when the application is executed by the backup entity, the method defined by the application comprising:
   the backup entity determining that a failure occurred such that messages are not exchangeable between the backup entity and an active entity;
   the backup entity taking over control of at least one resource from the active entity for a first period of time to oversee or manage the at least one resource in response to the determining that the failure occurred;
   the backup entity dropping control of the at least one resource after the first period of time elapses; and
   upon the backup entity determining that the active entity has not reinitiated control of the at least one resource within a second period of time after the backup entity dropped control of the at least one resource, the backup entity determining that the active entity experienced a failure and taking over control of the at least one resource to oversee or manage the at least one resource.

10. The computer readable medium of claim 9, wherein the method also comprises:
    the backup entity observing the at least one resource to monitor a status of service associated with the at least one resource within the second period of time to determine whether the status of service is at or exceeds a predetermined threshold value.

11. The computer readable medium of claim 10 wherein the predetermined threshold value is exceeded when the predetermined threshold value is below or above a pre-selected value.

12. The computer readable medium of claim 9 wherein the backup entity is a computer comprising at least one processor and a non-transitory memory.

13. The computer readable medium of claim 12 wherein the at least one resource and the backup entity are within an enterprise network.

14. The computer readable medium of claim 12 wherein the failure is when all communication connections between the active entity and the backup entity fails such that messages are not exchangeable between the backup entity and the active entity.

15. A communication apparatus comprising:
    a backup entity having at least one processor unit communicatively connected to at least one non-transitory computer readable medium, the backup entity communicatively connectable to an active entity via at least one communication connection, the backup entity configured to determine that a failure occurred that prevents messages from being exchanged between the backup entity and the active entity;
    the backup entity configured to take over control of at least one resource from the active entity for a first period of time to oversee or manage the at least one resource in response to determining that the failure occurred;
    the backup entity configured to drop control of the at least one resource after the first period of time elapses; and
    the backup entity configured so that, upon the backup entity determining that the active entity has not reinitiated control of the at least one resource within a second time period after the backup entity dropped control of the at least one resource, the backup entity determining that the active entity experienced a failure and taking over control of the at least one resource to oversee or manage the at least one resource.

16. The communication apparatus of claim 15, comprising:

the at least one resource communicatively connectable to the active entity and the backup entity.

17. The communication apparatus of claim 16, comprising:

the active entity having at least one processor unit communicatively connected to at least one non-transitory computer readable medium; the active entity configured to oversee or manage the at least one resource to provide a service and the backup entity configured to provide a redundancy service for the active entity.

18. The communication apparatus of claim 17, wherein the active entity is configured to monitor the at least one resource to assess a status of service associated with the at least one resource during the first period of time to determine whether the status of service associated with the at least one resource is improved relative to when the at least one resource is overseen or managed by the active entity to determine whether the active entity should retake control of the at least one resource during the second time period.

19. The communication apparatus of claim 15, wherein the communication apparatus is a communication system, a gateway, or a server; and wherein the failure is a failure of at least one communication connection such that all communication connections between the active entity and the backup entity are inoperable for exchanging messages between the backup entity and the active entity.

20. The communication apparatus of claim 15, wherein the communication apparatus is located within an enterprise network.

21. The communication apparatus of claim 15, wherein:

the backup entity is configured to send at least one first message so that the at least one resource responds to the first message by sending a first acknowledgement of the first message to the active entity; and wherein the active entity is configured to send at least one second message to the at least one resource message in response to the first acknowledgement such that the at least one resource sends a second acknowledgement to the backup entity in response to receiving the second message.

* * * * *